(12) United States Patent
Rabb (10) Patent No.: US 10,991,218 B2
(45) Date of Patent: *Apr. 27, 2021

(54) SHARING VIDEO STREAM DURING AN ALARM EVENT

(71) Applicant: GOOGLE LLC, Mountain View, CA (US)

(72) Inventor: Laura Rabb, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,033

(22) Filed: Dec. 2, 2019

(65) Prior Publication Data

US 2020/0211346 A1 Jul. 2, 2020

Related U.S. Application Data

(63) Continuation of application No. 14/979,700, filed on Dec. 28, 2015, now Pat. No. 10,497,233.

(51) Int. Cl.
| | | |
|---|---|---|
| *G08B 13/196* | (2006.01) |
| *H04L 12/58* | (2006.01) |
| *H04L 29/06* | (2006.01) |
| *G08B 25/08* | (2006.01) |
| *H04L 12/18* | (2006.01) |

(52) U.S. Cl.
CPC . *G08B 13/19656* (2013.01); *G08B 13/19695* (2013.01); *G08B 25/08* (2013.01); *H04L 12/1895* (2013.01); *H04L 51/04* (2013.01); *H04L 63/102* (2013.01)

(58) Field of Classification Search
CPC ........ G08B 13/19656; G08B 13/19695; G08B 25/08; H04L 12/1895; H04L 51/04; H04L 51/10; H04L 51/24; H04L 63/102
See application file for complete search history.

(56) References Cited

U.S. PATENT DOCUMENTS

| | | |
|---|---|---|
| 6,400,265 B1 | 6/2002 | Saylor et al. |
| 6,798,344 B2 | 9/2004 | Faulkner et al. |
| 8,520,072 B1 | 8/2013 | Slavin et al. |
| 8,842,179 B2 | 9/2014 | Renkis et al. |
| 10,497,233 B2 | 12/2019 | Rabb |
| 2002/0005894 A1 | 1/2002 | Foodman et al. |
| 2004/0036596 A1 | 2/2004 | Heffner et al. |

(Continued)

FOREIGN PATENT DOCUMENTS

| | | |
|---|---|---|
| WO | WO 2014/072910 A1 | 5/2014 |
| WO | WO 2014/144628 A3 | 9/2014 |

OTHER PUBLICATIONS

Prosecution History from U.S. Appl. No. 14/979,700 dated Sep. 21, 2017 through Aug. 1, 2019, 153 pp.

*Primary Examiner* — Farzana Hossain
(74) *Attorney, Agent, or Firm* — Shumaker & Sieffert, P.A.

(57) ABSTRACT

A camera system configured to provide access to a video stream of an owner's monitored site is provided. The camera system includes a camera and a processor. The processor is configured to receive an alarm indication that indicates that an alarm event has been detected, generate a pointer to provide temporary access to a video stream of the monitored site, transmit an event notification to one or more authorized sharers to provide access to the video stream of the monitored site, the event notification including the pointer, and revoke access from the one or more authorized sharers to the video stream of the monitored site when an end alarm event is detected.

17 Claims, 7 Drawing Sheets

(56) References Cited

U.S. PATENT DOCUMENTS

| | | |
|---|---|---|
| 2005/0068175 A1 | 3/2005 | Faulkner et al. |
| 2005/0174229 A1 | 8/2005 | Feldkamp et al. |
| 2005/0277421 A1 | 12/2005 | Ng et al. |
| 2009/0042604 A1 | 2/2009 | Ficquette et al. |
| 2009/0243834 A1 | 10/2009 | Sennett et al. |
| 2010/0238286 A1 | 9/2010 | Boghossian et al. |
| 2012/0001755 A1 | 1/2012 | Conrady |
| 2016/0105644 A1 | 4/2016 | Smith et al. |
| 2018/0040215 A1 | 2/2018 | Jackson |

FIG. 9

SHARING VIDEO STREAM DURING AN ALARM EVENT

RELATED APPLICATIONS

This application is a continuation of, and claims priority to, U.S. patent application Ser. No. 14/979,700, filed Dec. 28, 2015, titled "Sharing Video Stream During an Alarm Event," which is hereby incorporated by reference herein in its entirety.

BACKGROUND

The present invention relates to a security system. More specifically, the present invention relates to a security system that provides remote access to captured video at a monitored site.

Technology has increased consumers' desire for additional features. As such, companies are creating features that differentiate their respective company from their competition. The home security industry is no different.

One feature that exists today related to home security is the ability to view live streaming video of a monitored home by the owner(s) of the home. The ability to visually track what is going on in the owner's home has increased the popularity of home security systems. The benefit of video monitoring in the home is that it also gives the authorities visual evidence of what occurred at the home that triggered an alarm event.

As an added benefit, companies have allowed individuals to list other individuals (Sharers) that are able to view the live video feeds from the monitored site. The list of other individuals are able to access the live feed just as the owner is capable of doing. As a result, questions of privacy are a big issue with this type of service.

Also, response priority by police and other first responders may be based on whether an alarm event is active. For example, if an intruder alarm is detected, when confirmation is received by Police that the intruder is still on the premises. Police response priority is insured. In other words, a lower priority is place on the alarm when there is no verification that an intruder is still there. Generally, a security service and first responders do not have access to the live video stream that may be provided to an owner of the monitored site. Therefore, verification can only be made by the owner, which may be unavailable to provide the confirmation.

Accordingly, there exists a need for an improved security system.

BRIEF SUMMARY

According to an embodiment of the disclosed subject matter, a camera system configured to provide access to a video stream of an owner's monitored site is provided. The camera system includes a camera and a processor. The processor is configured to receive an alarm indication that indicates that an alarm event has been detected, generate a pointer to provide temporary access to a video stream of the monitored site, transmit an event notification to one or more authorized sharers to provide access to the video stream of the monitored site, the event notification including the pointer, and revoke access from the one or more authorized sharers to the video stream of the monitored site when an end alarm event is detected.

In a feature of the embodiment, the camera system is further configured to identify the one or more authorized sharers.

In a feature of the embodiment, wherein the event notification is transmitted via at least one of a text message, an email message, and instant message.

In a feature of the embodiment, wherein the pointer is an IP address that points to the video stream.

In a feature of the embodiment, wherein the end alarm event includes at least one of more of receiving by the camera system of an end event signal from the security system, receiving the end event signal from the owner of the monitored site, a predetermined amount of time after the event notification is received by the one or more authorized sharers, and receiving from at least one of the one or more authorized sharers that the alarm event has been confirmed.

In a feature of the embodiment, the camera system is further configured to determine a type of alarm event, and when the alarm event is determined to be one of an intruder alarm, fire alarm, and carbon monoxide alarm, generate the pointer.

In a feature of the embodiment, wherein identifying the one or more authorized sharers comprises determining a list of the one or more authorized sharers, and determining at least one of the listed one or more authorized sharers that is to receive the event notification.

In a feature of the embodiment, the camera system further includes a remote server, the remote server configured to receive the alarm event, and cause the camera to capture a current video image and send the captured video image and a video image taken at the time the detected alarm event occurred to the remote server for distribution.

According to an embodiment of the disclosed subject matter, a system comprises a security system configured to detect an alarm event at a monitored site, and a camera system, comprising a camera and a processor. The camera system configured to provide access to a video stream of an owner's monitored site is provided. The camera system includes a camera and a processor. The processor is configured to receive an alarm indication that indicates that an alarm event has been detected, generate a pointer to provide temporary access to a video stream of the monitored site, transmit an event notification to one or more authorized sharers to provide access to the video stream of the monitored site, the event notification including the pointer, and revoke access from the one or more authorized sharers to the video stream of the monitored site when an end alarm event is detected.

According to an embodiment of the disclosed subject matter, a method, in a camera system comprising a camera and a processor, for providing access to a video stream of an owner's monitored site. The method comprises receiving an alarm indication at the camera system that indicates that an alarm event has been detected at the monitored site, generating, by the camera system, a pointer to provide temporary access to a video stream of the monitored site, transmitting, from the camera system, an event notification to one or more authorized sharers to provide access to the video stream of the monitored site, the event notification including the pointer, and revoking, by the camera system, access from the one or more authorized sharers to the video stream of the monitored site when an end alarm event is detected.

According to an embodiment of the disclosed subject matter, means for accessing a video stream of an owner's monitored site are provided, comprising a means for receiving an alarm indication that indicates that an alarm event has been detected, generating a pointer to provide temporary access to a video stream of the monitored site, transmitting an event notification to one or more authorized sharers to provide access to the video stream of the monitored site, the event notification including the pointer, and revoking access from the one or more authorized sharers to the video stream of the monitored site when an end alarm event is detected.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

A disclosed implementation of the present subject matter is directed to providing owner/subscriber/user authorized individuals with temporary access to a user's live video stream of a monitored site during a detected alarm event. Upon detection of an alarm event, temporary access is granted to the user's authorized individuals to view the real-time video of the monitored site such that one or more of the authorized individuals can confirm that the alarm event is still in progress. For example, the authorized individuals may review the live video stream and confirm that an intruder is still present at the monitored site, and confirm this information with the appropriate authorities. Once the alarm event is confirmed, priority treatment by the appropriate authorities is determined.

Figure 1:
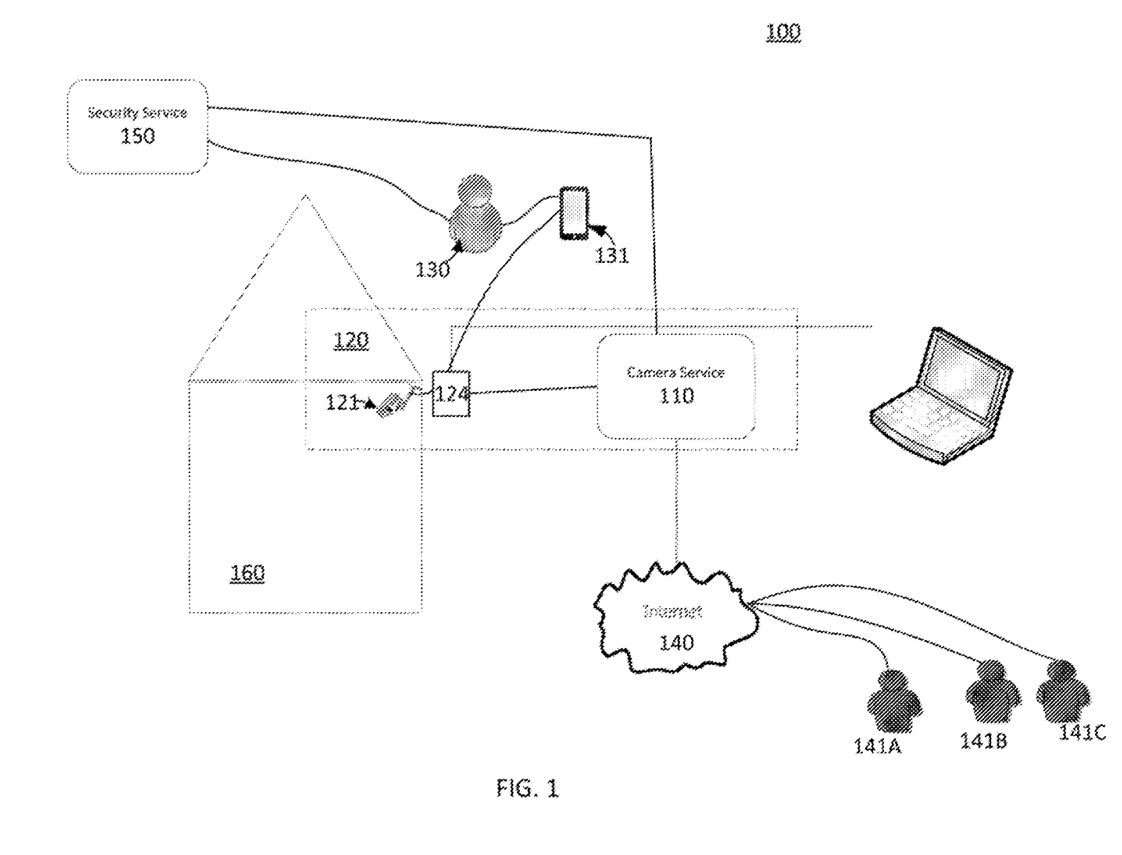
FIG. 1 shows an example networked monitoring system according to an embodiment of the disclosed subject matter.

An implementation of a disclosed networked monitoring system, including a security system and camera system, in accordance with the present subject matter, allows authorized persons to view a shared video stream of a user's monitored site to provide the appropriate authorities with visual confirmation of a detected alarm event. An example of a networked monitoring system 100 is illustrated in FIG. 1. The networked monitoring system 100 includes a security service 150 and a camera system 120. The camera system 120 includes a camera 121 configured to video monitor one or more areas of a monitored site 160 and a processor (not shown) that receives the captured video taken from the camera and processes the video for storage and transmission to a camera service/server 110 and/or a user's 130 computing device 131. The camera 121 may be any camera that is capable of producing video images of an area monitored by the camera. In the disclosed implementation, one or more cameras may be included in the camera system 120 such that the monitored site is fully monitored by video surveillance.

Figure 2:
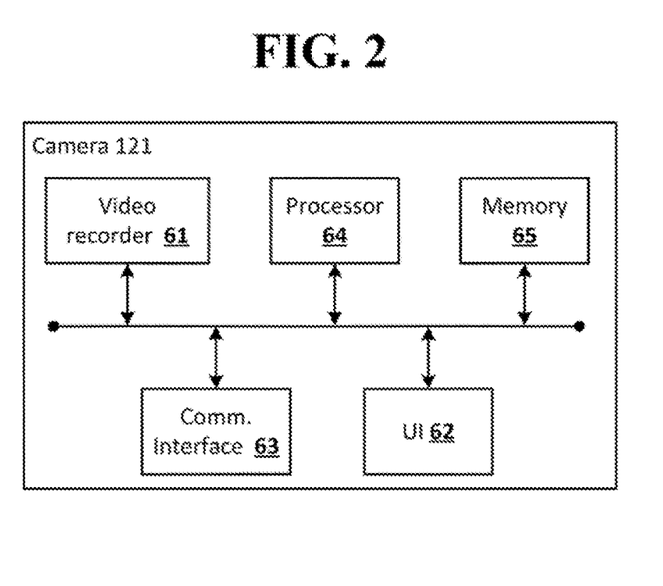
FIG. 2 shows an example camera according to an embodiment of the disclosed subject matter.

The camera 121 may include hardware in addition to the specific physical camera that obtains the video images. FIG. 2 shows an example camera 121 as disclosed herein. A processor 64 may receive and analyze data obtained by the video recorder 61, control operation of other components of the camera 121, and process communication between the sensor and other devices. The processor 64 may execute instructions stored on a computer-readable memory 65. The memory 65 or another memory in the camera 121 may also store environmental data obtained by the video recorder 61. A communication interface 63, such as a Wi-Fi or other wireless interface, Ethernet or other local network interface, or the like may allow for communication by the camera 121 with other devices. A user interface (UI) 62 may provide information and/or receive input from a user of the sensor. The UI 62 may include, for example, a speaker to output an audible alarm when an event is detected by the camera 121. Alternatively, or in addition, the UI 62 may include a light to be activated when an event is detected by the camera 121. The user interface may be relatively minimal, such as a limited-output display, or it may be a full-featured interface such as a touchscreen. Components within the camera 121 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown. It should be noted that the camera processor 61 may be the camera system processor as well, performing all processing for the camera system 120.

The camera processor receives and processes an alarm signal. The alarm signal is generated upon detection of an alarm event at the monitored site. As disclosed herein, an alarm event may be any event that is detected by one or more sensors and once processed, triggers an alarm at a monitored site. The alarm event is then forwarded to the security service 150 that remotely monitors the sensors, and/or other networked sensors at the monitored site, for example the disclosed camera system 121. When the camera processor receives the alarm signal, the processor initiates the capture and storage of video taken by the camera 121, e.g., the capture of the video recorded prior to the alarm event, and capture of the video being recorded during the alarm event. The amount of recorded video captured prior to the alarm event may be determined by the camera service 110, the user 130, and/or an amount that is set within the camera 121. The captured video from the camera system 120 is forwarded to the camera service 110 for storage and distribution, and/or stored in the memory 65 (shown in FIG. 2). The camera service 110 may be a service that allows a user to view the monitored site that includes a camera. In accordance with a disclosed implementation, the user may access a live video stream of the monitored site using a mobile application that is provided on the user's mobile device 131. The user 130 may also be able to access the live video stream via a computing device using a link to an IP address that may require the user to input certain identification (ID) information to verify that the user is the authorized user to access the live video stream. How the user accesses the live video stream may be defined by the camera service, and is, therefore, not germane to the present disclosure.

If the camera system is associated with the security service 150, the captured video may be forwarded to the security service 150 for storage and distribution.

In an implementation, the alarm signal may be generated by the camera system processor, wherein the camera includes a sensor (not shown). The camera sensor may detect an unexpected motion within the monitored area, or an unexpected sound, such as an alarm at the monitored site from another sensor. The camera 121 may also receive the alarm signal from a networked sensor, such as those used in a smart-home environment.

The camera service 110 provides the user 130 with the capability to view real-time video of the monitored site 120. The camera service may be provided in conjunction with the security service/server or by a separate service offered by a separate entity.

Alternatively, the camera service is provided in conjunction with the purchase of the camera, thereby allowing the user to view the monitored site without the need for a security service. In this implementation, the camera system may include a server located on the premises or remotely, e.g., a Cloud server, that provides the user access to the server via an IP address and/or URL.

The camera service 110 may receive the captured video and forward the captured video to the designated location for the user's 131 viewing, for example, via the camera service App executed on the user's mobile device 131, or a designated IP address that is accessible only by the user 130.

When the camera system 120 receives an alarm event indication e.g., from the security service 150, the camera system 120 determines whether the user has identified any individuals and/or third parties that are authorized to receive an indication that an alarm event has occurred and view the captured video. In accordance with the disclosed implementation, the individuals (i.e., Sharers) 141A, 141B, 141C that have been identified by the user are authorized to share access to the captured video stream upon the determination by the camera system 120 that an alarm event has occurred. In the disclosed implementation, the camera system 120 provides the user 130 with access to the captured video stream any time the user 130 wishes to view the information, based on the user's agreement with the camera service 110 provider, and to the authorized sharers 141A, 141B, 141C during an alarm event.

In accordance with a disclosed implementation, the camera system 120 generates a temporary access portal 140 that temporarily allows access by the Sharers 141A, 141B, 141C to the user's 130 captured video. For example, the camera service 110 may generate a temporary IP address where the Sharer 141A . . . 141C may go to view the captured video stream. The temporary access portal 140 preferably does not have a direct link to the captured video through the camera service 110 as may be available to the user 130. The temporary access portal 140 preferably includes a pointer, for example, an IP address or URL, that temporarily points to the captured video. Since the pointer is generated only upon the detection of an alarm event, the authorized one or more sharers are able to access the captured video only when the alarm event is detected.

In an implementation, the camera service may require the authorized sharers to enter ID information upon being identified by the user. An email or other notification is provided to the authorized sharer that requests the authorized sharer to provide certain information that may be used by the camera service to ensure that access to the captured video stream is given only to those authorized sharers that have provided the requested ID information. The ID information may be used by the camera service to permit and revoke access to the information located at the generated URL.

ID information, though, may not be required for input by the identified sharers when the sharer accesses the temporary access portal (to be disclosed below).

Figure 3:
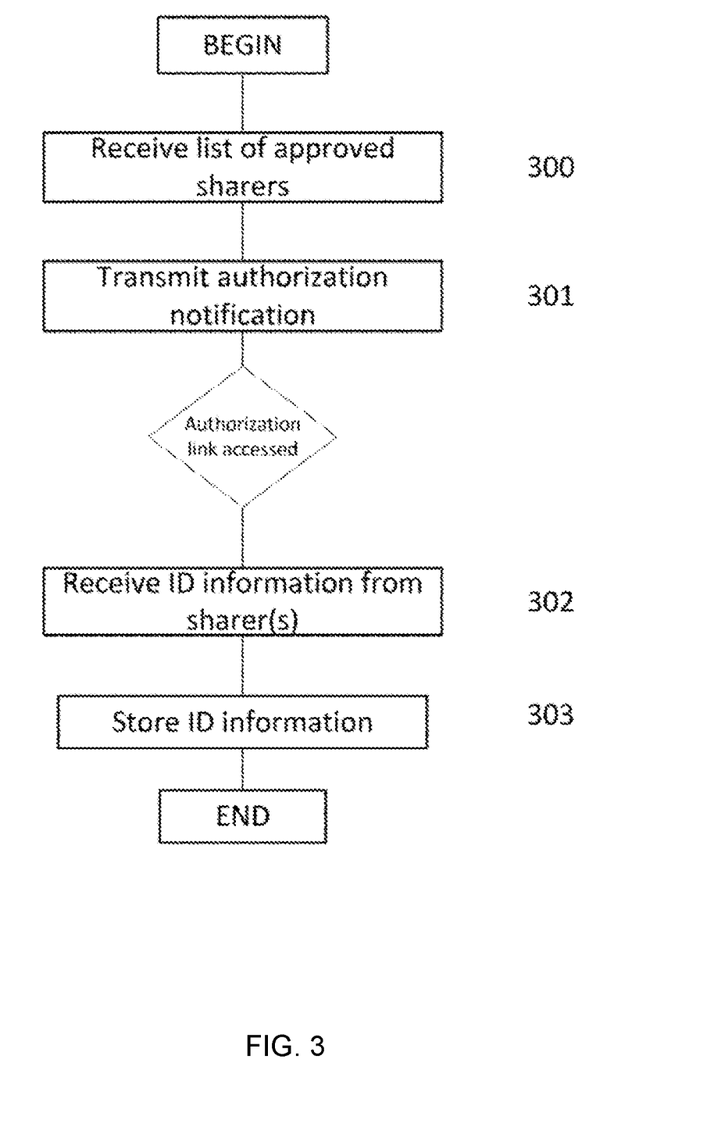
FIG. 3 shows an example flow diagram of a method for authorizing one or more Sharer(s) according to an embodiment of the disclosed subject matter.

An example flow diagram of the method for generating a list of one or more authorized sharer(s) for a user is illustrated in FIG. 3. The camera service receives from the user one or more approved sharers (300). The one or more approved sharer(s) from the user preferably include contact information for the approved sharer, including, for example, an email address and/or a mobile phone number. Once the camera service has the approved one or more sharers, the camera service forwards to each of the one or more sharers an authorization notification (301). The authorization notification preferably includes a link that when accessed by the sharer provides the sharer the ability to enter ID information.

When a sharer that received the authorization notification accesses the link, the camera service requests ID information from the sharer that is used to ensure that the sharer notified during an alarm event is one of the one or more approved sharers (302). It is preferable that ID information is required by the camera service to be input by the sharer when the sharer attempts to access the captured video during an authorized time period and/or event. ID information may include any personal information of the sharer that can be used by the camera service to positively confirm that the sharer is who they say they are when requesting to accesses the user's captured video. For example, ID information may include one or more of Name, Email address, password, personal ID number, UserName, etc. Once the sharer inputs the ID information, the camera service stores the ID information in memory for use in confirming the sharer when appropriate (303).

Figure 4:
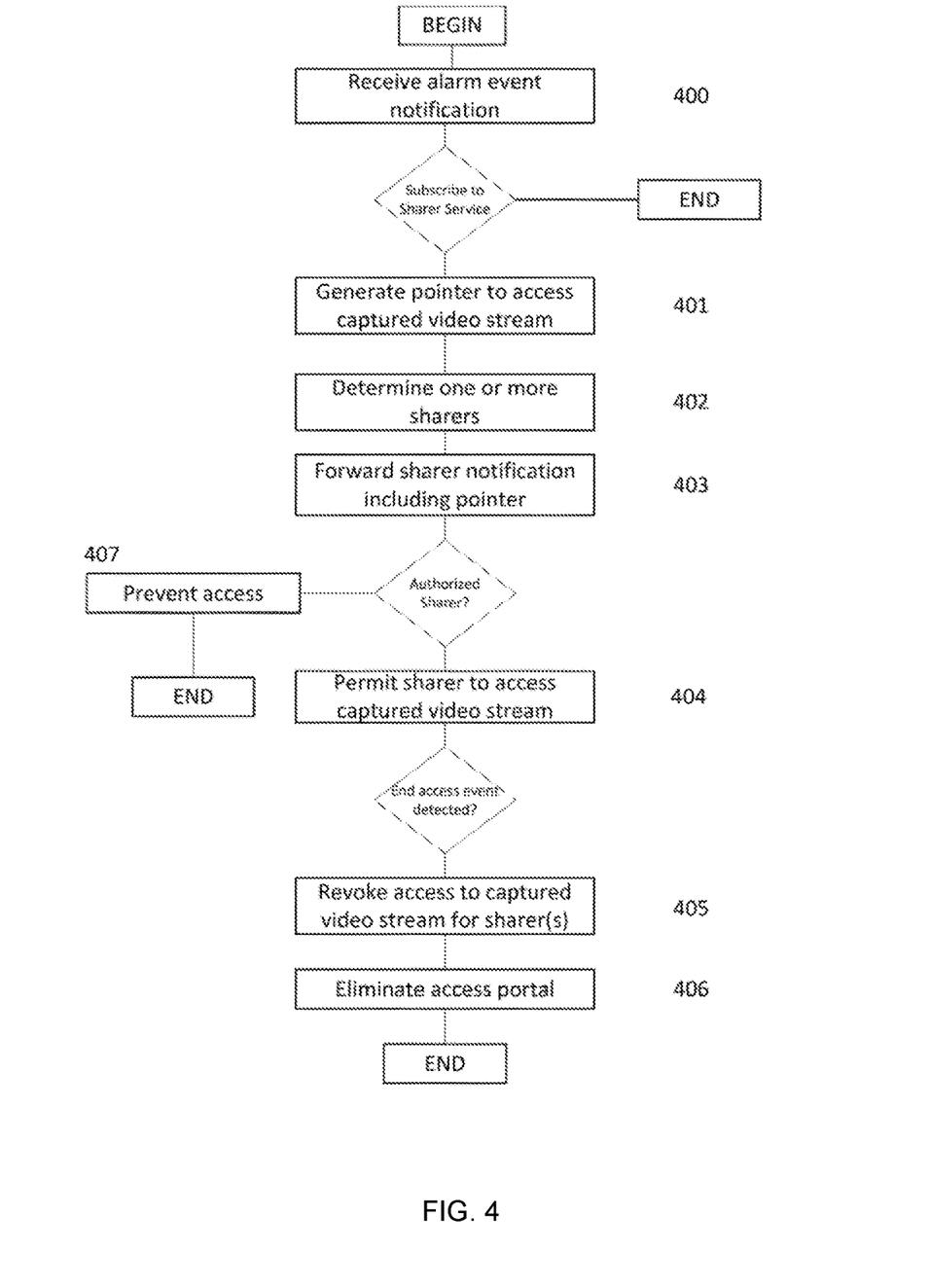
FIG. 4 shows an example flow diagram of a camera system response when an alarm event notification is received according to an embodiment of the disclosed subject matter.

An example flow diagram of a camera system response to when an alarm event notification is received by the camera service is illustrated in FIG. 4. When an alarm event notification is received by the camera service (400), the camera service determines if the user/subscriber associated with the monitored site of the received alarm event has provided a list of approved sharers, as disclosed above.

In an implementation, the camera service may allow the user to provide rules for allowing access to the user's captured video during an alarm event that the camera service must apply when determining which sharer(s) is/are to receive the alarm notification. For example, the user may request that access be allowed only after a designated time period after the alarm event has been received to give the user time to respond to the event first, either by deactivating the alarm event or confirming the alarm event to the appropriate authorities. The user may request that the users be informed by priority, i.e. highest priority in the list notified immediately, and other priorities accordingly, thereby allowing only the necessary number of sharers to access the captured video in order to confirm the alarm event. Example sharer trees are illustrated in FIGS. 5A, 5B, and 5C.

Figure 5A:
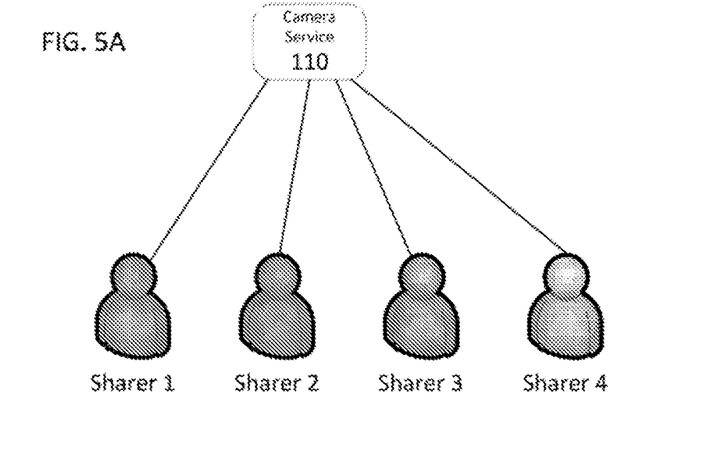
FIGS. 5A, 5B, and 5C show example call tree diagrams according to an embodiment of the disclosed subject matter.

As illustrated in FIG. 5A, the camera service may transmit the sharer notification to all of the user's sharer's at the same time, thereby notifying each sharer of the detection of an alarm event at the user's monitored site.

Figure 5B:
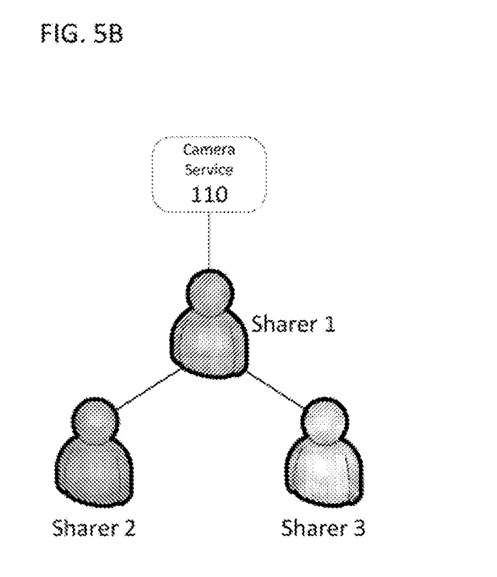

FIG. 5B illustrates the client service transmitting the sharer notification to a first sharer, e.g., Sharer1, and then if Sharer1 is unable to view or access the temporary access portal, the sharer notification is transmitted to the next level of sharers, e.g., Sharer2 and Sharer3.

Figure 5C:
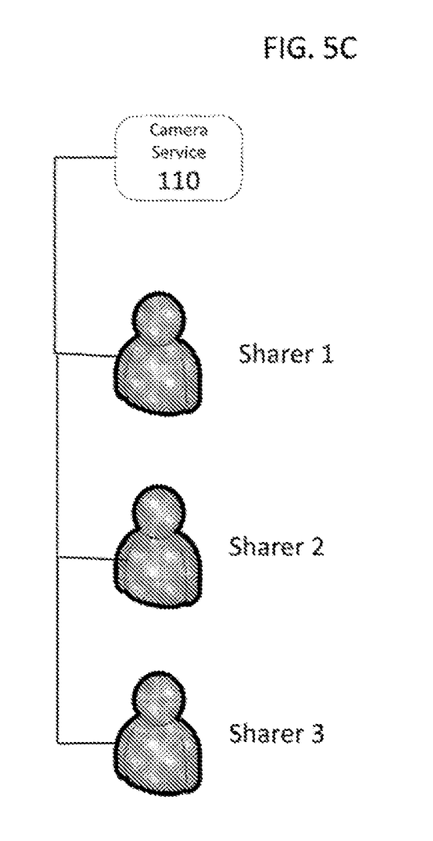

FIG. 5C illustrates the transmission by the client service of the sharer notification base on a priority assigned to each sharer. In the illustrated example, Sharer1, having the highest priority, receives the sharer notification first. If Sharer1 is unable to confirm the alarm event, Sharer2 receives the sharer notification, and so on, until the alarm event is confirmed and/or an end alarm event is determined by the camera service.

The user may request that the camera service delay in notifying the approved sharers until the user provides a sharer request indication to the camera service indicating that the user would like at least one of the one or more approved sharers to confirm the alarm event. In accordance with this implementation, the sharer alarm notification would be forwarded to the appropriate one or more sharers, after receipt by the camera service of the sharer request notification.

The user may request that the camera service only send the sharer alarm notification to the one or more approved sharers upon the receipt of only certain types of alarm events. For example, the user may want to have the approved sharers only confirm alarm events related to the detection of movement in the monitored site, or during a carbon monoxide alarm event to confirm that people are still present in the monitored site. If an alarm event notification is received by the camera service that is unrelated to the user identified alarm type(s), the camera service does not forward a sharer alarm notification.

The user may request that the approved sharers be notified of an alarm event only during times when the user may be inaccessible, for example, when on vacation, in a meeting, etc. The user therefore is able to activate/deactivate the sharer service at any time. Activation/deactivation may be accomplished via the camera service application, through a website operated by the camera service, via the portal used by the user to view all captured video. For example, when the user is leaving on vacation, the user may access the camera service application and select an activation button to notify the camera service that the user will be unavailable to confirm the alarm event and should contact the approved sharers in accordance with the disclosed implementation.

Referring back to FIG. 4, if the user has provided one or more approved sharers, the camera service may generate a pointer to an access portal that allows the one or more approved sharers to view the user's captured video (401). In the disclosed implementation, the camera service generates a temporary access portal for use by the approved sharers during an alarm event. The access portal may be a temporary area designated by the camera service to feed the received user's captured video into for the purpose of viewing by the approved sharer. The access portal may also be linked to the user's feed to the captured video via the camera service. The pointer is preferably a link that when selected by the approved sharer, opens the access portal that includes the captured video. For example, the pointer may be an IP address and/or URL.

Once the camera service has generated the pointer, the camera service determines to whom a sharer notification is to be sent (402), and forwards the sharer notification to the appropriate approved sharer(s) (403). The approved sharer(s) may receive the sharer notification in any manner that allows the approved sharer to access the generated access portal using the pointer. For example, the sharer notification may be forwarded via a text message to the approved sharer's mobile device, and/or via an email to the approved sharer's email address. The sharer notification includes the generated pointer. The sharer notification also includes an indication that an alarm event has been detected at the user's monitored site and directs the approved sharer to select the pointer (e.g., a URL) to temporarily view the user's captured video stream.

As disclosed above, the access portal is temporary. Accordingly, the approved sharer(s) may access and view the captured video for a limited and predefined amount of time (404). When the camera service detects and/or determines an end alarm event, the camera service revokes access to the access portal, which immediately prevents the sharer(s) from viewing the captured video through the access portal (405). Access to the captured video may still be available to the user and the camera service if needed by the appropriate authorities, e.g., Police, Fire, etc.

In an implementation, revocation of access to the access portal may prevent the sharer(s) from continuing to view the live video stream of the monitored site but still allow access to certain stored video. For example, the sharer(s) may be able to continue to access the stored video of the moments captured by the camera system prior to the activation of the alarm event.

An end alarm event may be set by the user or the camera service. For example, the camera service may determine that an approved sharer only needs to view the captured video for a limited amount of time, e.g., 4 to 15 minutes after the receipt of the alarm event notification or generation of the access portal. The camera service may revoke access upon receipt of an end event notification from the security service indicating that the alarm event has been addressed and is no longer an emergency, upon receipt of a notification from the user to revoke access to the captured video, when the appropriate authorities have arrived at the monitored site, and/or once at least one approved sharer indicates to the camera service that the alarm event has been confirmed by the respective approved sharer.

Access to the access portal may also be revoked for individual sharers. For example, the camera service may revoke access if an approved sharer does not access the access portal within a certain predefined amount of time, and/or that another approved sharer has already accessed the access portal, thereby limiting the number of sharers that have viewed the captured video during the alarm event.

Once access to the access portal has been revoked for all approved sharers, the camera service deletes the captured video from the access portal and the pointer to ensure that the captured video available during the alarm event cannot be accessed through the access portal later (406). All captured video will once again only be available through the user's portal and/or through the camera service in accordance with agreements between the user and the camera service and/or security service.

In an implementation, the camera service may require the approved sharer to prove that the person that has selected the pointer is actually the approved sharer using the ID information that has been stored at the camera service. In this implementation, the sharer will be asked to provide the appropriate ID information, e.g., PIN number or password, prior to being able to view the captured video, as disclosed herein. If the sharer is unable to confirm that they are an approved sharer, the camera service prevents access to the captured video (407).

In an implementation, the camera service may determine whether the notified approved sharers attempted to access the captured access portal. In this implementation, the camera service stores an access indication relating to whether the approved sharer has accessed viewed the captured video. The access indication may be used by the user and/or the camera service to determine whether the respective approved sharer should continue to be an approved sharer.

It is preferable that the approved sharer not be required to have access to the camera service's application and/or be a member of the camera service for purposes of this disclosure, although the approved sharer may be a member.

In an implementation, when the sharer may access the access portal a user-interface may be displayed to the sharer may include one or more video streams based on the number of cameras included in the user's camera system. For example, when a camera system includes more than one camera, the user-interface displayed in the access portal includes each of the video streams from each of the more than one cameras, including the stored video of each camera, as disclosed above.

Figure 6:
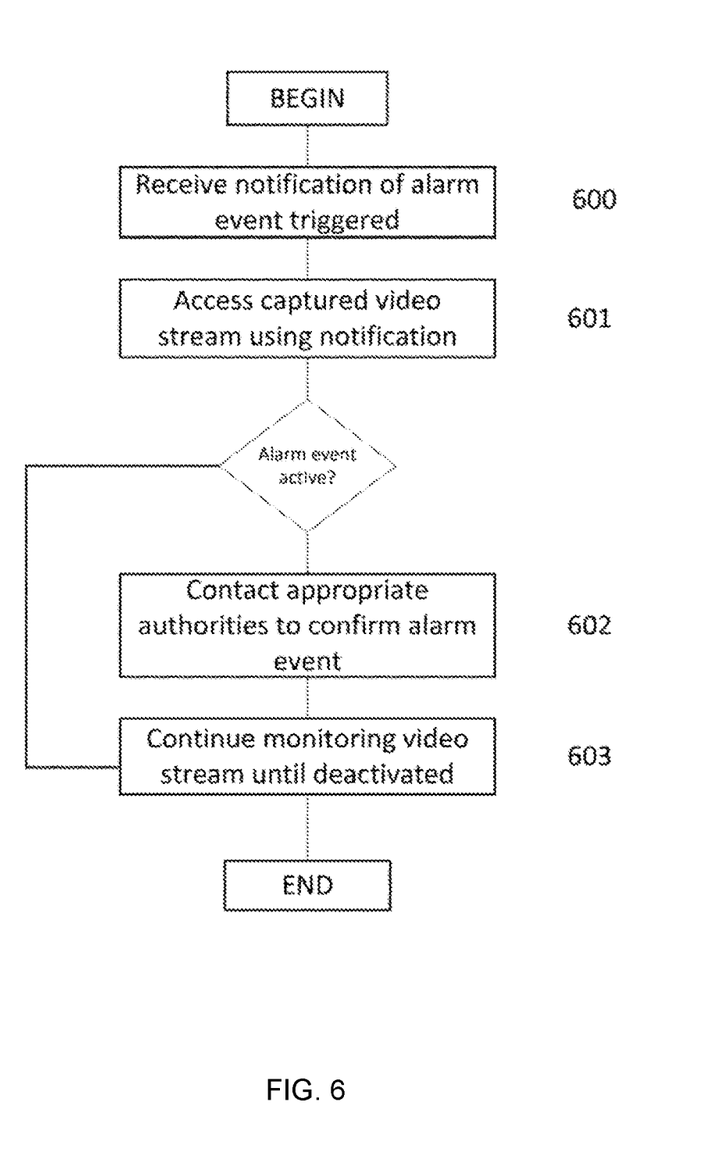
FIG. 6 is an example flow diagram illustrating a method used by a Sharer once a sharer notification is received according to an embodiment of the disclosed subject matter.

An example flow diagram illustrating a method used by the sharer once a sharer notification is received is shown in FIG. 6. The sharer receives the sharer notification from the camera service including the access pointer (600). The sharer then accesses the access portal to view the captured video in response to the notification (601). Once the sharer is able to view the captured video, the sharer determines whether the alarm event is active. For purposes of this disclosure, an active alarm event may include an intruder on the premises, video or picture evidence of the intruder, a person at the monitored site that may be in potential danger as a result of the alarm event, and/or any other situation wherein the response to the alarm event may be prioritized upon confirmation of the situation.

Once the sharer has identified that the alarm event is active based on the captured video, the sharer may contact the appropriate authorities, e.g., police, fire, rescue, security service, etc. (602). Depending on the rules of the camera service or the user, the sharer may continue to monitor the captured video until an end event is determined by the camera service and access to the captured video is revoked (603).

In an implementation, when a camera system includes multiple cameras located in different areas of the monitored site, the captured video of each camera is made available in the access portal regardless of where in the monitored site the alarm event was initiated. This allows a sharer to view all of the monitored site in the event that the cause of the alarm event has moved to another area.

In an embodiment, the camera service may determine, based on the alarm event, which of the camera streams that the sharer(s) is able to view. For example, if an intruder is detected in an area of a monitored site that is monitored by a first camera, the camera service may determine that the first camera has video of the area prior to triggering of the alarm event and therefore capture video of the moments prior to the triggering of the alarm event for the first camera only. The video from the other cameras in the camera system may not be captured for the moment prior to the triggering alarm event. Live video streams from each of the cameras in the camera system may be captured as well, and made accessible to the sharer(s).

Embodiments disclosed hereinabove may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 7:
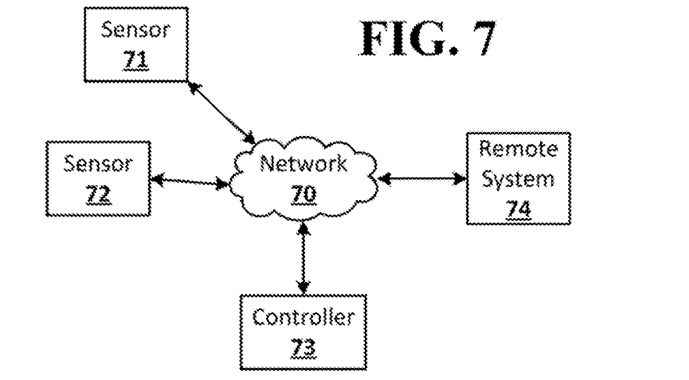
FIG. 7 shows an example of a sensor network suitable for implementing embodiments of the presently disclosed subject matter.

FIG. 7 shows an example of a sensor network, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 7 may be an example of a smart-home environment as disclosed hereinabove. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 7.

For example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 7, and the controller 73 may control an alarm system to provide a visual and/or audible alarm to the user of the smart-home environment.

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 7. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 7 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 7 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may provide to users via messages sent to one or more user electronic devices. For example, the messages can be sent via email, short message service (SMS), multimedia messaging service (MIMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 8:
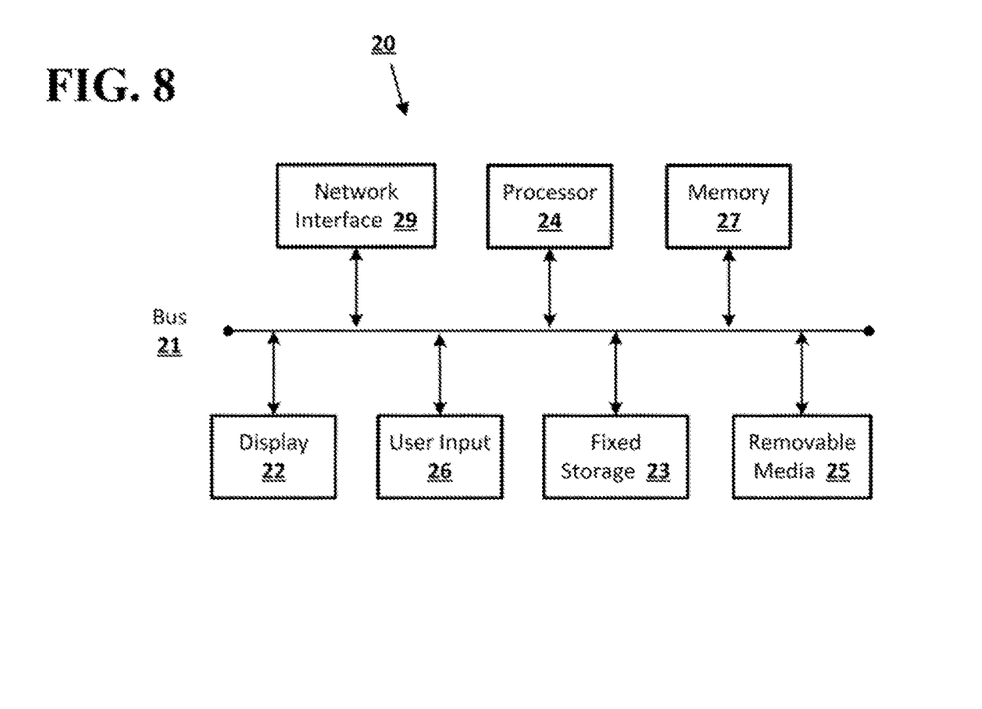
FIG. 8 is an example computing device suitable for implementing embodiments of the presently disclosed subject matter.

Embodiments of the presently disclosed subject matter may be implemented in and used with a variety of computing devices. FIG. 8 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth(R), near-field, and the like. For example, the network interface 29 may allow the device to communicate with other computers via one or more local, wide-area, or other communication networks, as described in further detail herein.

Figure 9:
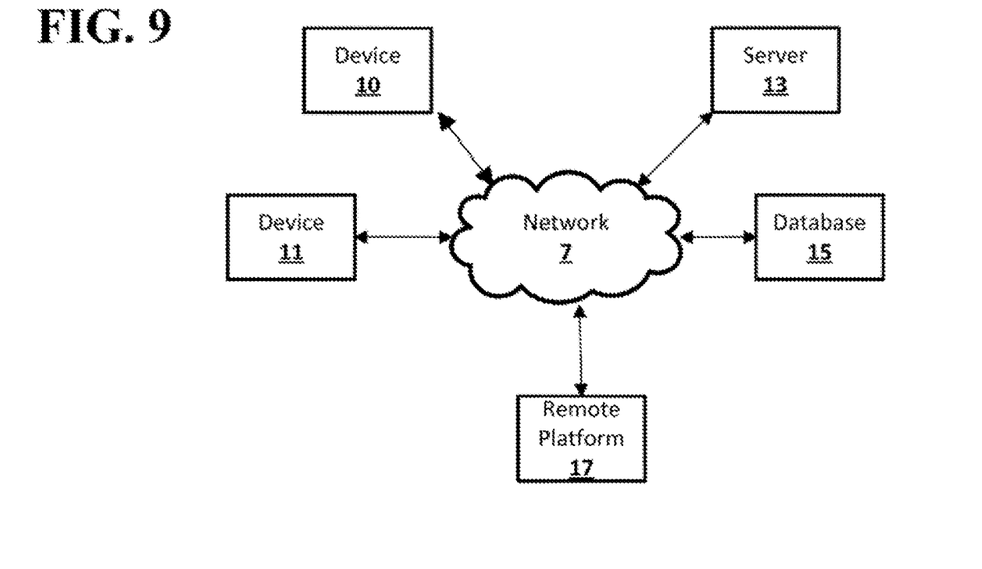
FIG. 9 shows an example network arrangement according to an embodiment of the disclosed subject matter.

FIG. 9 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method performed by a camera system comprising a camera and a processor, communicatively coupled to the camera, the method comprising:
   receiving from an authorized user of the camera an identification of one or more sharers authorized by the authorized user to receive event notifications of a monitored site;
   detecting an alarm event at the monitored site;
   capturing by the camera a live video stream corresponding to the alarm event;
   transmitting the live video stream to a server system;
   transmitting a notification of the alarm event to one or more devices of the one or more authorized sharers, the notification including a reference to the live video stream that, when selected by the one or more authorized sharers, enable the one or more authorized sharers to access the live video stream of the monitored site;
   detecting an end alarm event; and
   without user interaction, in response with the end alarm event, revoking access to the live video stream from the one or more authorized users.

2. The method of claim 1, further comprising:
   after receiving the identification of the one or more authorized sharers, sending a request to each of the authorized sharers to provide identifier information;
   wherein the enable the authorized sharers to access the live video stream of the monitored site is given only to authorized sharers that have provided the identifier information.

3. The method of claim 1, wherein transmitting the notification of the alarm event to the one or more devices includes transmitting the notification to the one or more devices via at least one of a text message, an email message, and an instant message.

4. The method of claim 1, wherein the live video stream of the monitored site is accessed using an application that is provided on the one or more devices.

5. The method of claim 1, wherein the camera includes a sensor, and detecting the alarm event at the monitored site includes detecting the alarm event via the sensor.

6. The method of claim 1, further comprising storing the video stream.

7. The method of claim 1, further comprising:
   in response to the alarm event, transmitting a predetermined amount of video captured by the camera prior to the alarm event to a storage system to be stored.

8. The method of claim 1, wherein the reference to the live video stream is a URL that points to the video stream.

9. A camera system comprising:
   a camera;
   a processor communicatively connected to the camera;
   memory coupled to the processor; and
   one or more programs stored in the memory and configured for execution by the processor, the one or more programs comprising instructions for:
     receiving from an authorized user of the camera an identification of one or more authorized sharers authorized by the authorized user to receive event notifications of a monitored site;
     detecting an alarm event at the monitored site;
     capturing by the camera a live video stream corresponding to the alarm event;
     transmitting the live video stream to a server system;
     transmitting a notification of the alarm event to one or more devices of the one or more authorized sharers, the notification including a reference to the live video stream that, when selected by the one or more authorized sharers, enable the one or more authorized sharers to access the live video stream of the monitored site;
     detecting an end alarm event and
     without user interaction, in response with the end alarm event, revoking access to the live video stream from the one or more authorized users.

10. The camera system of claim 9, the one or more programs further comprising instructions for:
    after receiving the identification of the one or more authorized sharers, sending a request to each of the authorized sharers to provide identifier information;
    wherein the enable the authorized sharers to access the live video stream of the monitored site is given only to authorized sharers that have provided the identifier information.

11. The camera system of claim 9, wherein the instructions for transmitting the notification of the alarm event to the one or more devices include instructions for transmitting the notification to the one or more devices via at least one of a text message, an email message, and an instant message.

12. The camera system of claim 9, wherein the camera includes a sensor, and the instructions for detecting the alarm event at the monitored site include instructions for detecting the alarm event via the sensor.

13. The camera system of claim 9, the one or more programs further comprising instructions for storing the video stream.

14. The camera system of claim 9, the one or more programs further comprising instructions for:
    in response to the alarm event, transmitting a predetermined amount of video captured by the camera prior to the alarm event to a storage system to be stored.

15. A non-transitory computer readable storage medium storing one or more programs, the one or more programs comprising instructions that, when executed by a computing device, cause the device to perform operations comprising:

receiving from an authorized user of a camera identification of one or more authorized sharers authorized by the authorized user to receive event notifications of a monitored site;

detecting an alarm event at the monitored site;

capturing by the camera a live video stream corresponding to the alarm event;

transmitting the live video stream to a server system;

transmitting a notification of the alarm event to one or more devices of the one or more authorized sharers, the notification including a reference to the live video stream that, when selected by the one or more authorized sharers, enable the one or more authorized sharers to access the live video stream of the monitored site;

detecting an end alarm event; and without user interaction, in response with the end alarm event, revoking access to the live video stream from the one or more authorized users.

16. The non-transitory computer readable storage medium of claim 15, wherein the live video stream of the monitored site is accessed using an application that is provided on the one or more devices.

17. The non-transitory computer readable storage medium of claim 15, wherein the reference to the live video stream is a URL that points to the video stream.

* * * * *